US011379382B2

(12) United States Patent
Gupta et al.

(10) Patent No.: US 11,379,382 B2
(45) Date of Patent: Jul. 5, 2022

(54) CACHE MANAGEMENT USING FAVORED VOLUMES AND A MULTIPLE TIERED CACHE MEMORY

(71) Applicant: International Business Machines Corporation, Armonk, NY (US)

(72) Inventors: Lokesh M. Gupta, Tucson, AZ (US); Kevin J. Ash, Tucson, AZ (US); Beth A. Peterson, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/114,955

(22) Filed: Dec. 8, 2020

(65) Prior Publication Data

US 2022/0179801 A1    Jun. 9, 2022

(51) Int. Cl.
*G06F 12/123* (2016.01)
*G06F 12/02* (2006.01)
*G06F 12/0831* (2016.01)
*G06F 12/0895* (2016.01)

(52) U.S. Cl.
CPC ........ *G06F 12/123* (2013.01); *G06F 12/0238* (2013.01); *G06F 12/0833* (2013.01); *G06F 12/0895* (2013.01)

(58) Field of Classification Search
CPC ............. G06F 12/0238; G06F 12/0833; G06F 12/0895; G06F 12/123
See application file for complete search history.

(56) References Cited

U.S. PATENT DOCUMENTS

| 8,117,396 | B1* | 2/2012 | Fair ..................... H04L 67/1097 |
| | | | 711/133 |
| 10,223,286 | B2 | 3/2019 | Coleman |
| 10,235,054 | B1 | 3/2019 | Clark et al. |
| 10,235,291 | B1 | 3/2019 | Michaud et al. |
| 10,261,717 | B1 | 4/2019 | Martin et al. |
| 2003/0149843 | A1* | 8/2003 | Jarvis ................... G06F 12/123 |
| | | | 711/133 |
| 2012/0311177 | A1 | 12/2012 | Visharam et al. |

(Continued)

*Primary Examiner* — Aracelis Ruiz
(74) *Attorney, Agent, or Firm* — Robert M Sullivan

(57) ABSTRACT

A method for demoting a selected storage element from a cache memory includes storing favored and non-favored storage elements within a higher performance portion and lower performance portion of the cache memory. The favored storage elements are retained in the cache memory longer than the non-favored storage elements. The method maintains a first favored LRU list and a first non-favored LRU list, associated with the favored and non-favored storage elements stored within the higher performance portion of the cache. The method selects a favored or non-favored storage element to be demoted from the higher performance portion of the cache memory according to life expectancy and residency of the oldest favored and non-favored storage elements in the first LRU lists. The method demotes the selected from the higher performance portion of the cache to the lower performance portion of the cache, or to the data storage devices, according to a cache demotion policy. A corresponding storage controller and computer program product are also disclosed.

23 Claims, 9 Drawing Sheets

(56) References Cited

U.S. PATENT DOCUMENTS

| | | | |
|---|---|---|---|
| 2013/0232295 A1* | 9/2013 | Benhase | G06F 12/128 |
| | | | 711/103 |
| 2014/0115256 A1 | 4/2014 | Liu et al. | |
| 2017/0185520 A1* | 6/2017 | Matsuo | G06F 12/0862 |
| 2018/0181497 A1 | 6/2018 | Ash et al. | |
| 2018/0276263 A1 | 9/2018 | Voigt et al. | |
| 2018/0300257 A1 | 10/2018 | Ash et al. | |
| 2019/0155750 A1 | 5/2019 | Wang et al. | |

\* cited by examiner

CACHE MANAGEMENT USING FAVORED VOLUMES AND A MULTIPLE TIERED CACHE MEMORY

BACKGROUND

Field of the Invention

This invention relates generally to data processing and data storage systems, and more particularly to systems and methods for improving cache memory performance and management within a storage system.

Background of the Invention

In the fields of data processing or data storage systems, a "cache" or "cache memory" typically refers to a small, fast memory or storage media used to store data or instructions that were accessed recently, are accessed frequently, or are likely to be accessed in the future. Reading from or writing to a cache memory is typically less expensive, in terms of access time and/or resource utilization, than accessing other memory or storage devices. Once data is stored in cache memory, it can be accessed in cache memory instead of re-fetching and/or re-computing the data, saving time and system resources, and improving system performance.

Cache memories can be implemented as multi-level caches. For example, a cache memory system may include both "primary" and "secondary" caches. When reading data, a computing system or device may first look for data in the primary cache and, if the data is not located, look for it in the secondary cache. If the data is not in either cache, the computing system or device may retrieve the data from disk drives or other backend storage devices that reside behind the cache. When writing data, a computing system or device may write data to the primary cache. This data may subsequently be moved, or demoted or destaged, to the secondary cache or a storage device to free up memory space in the primary cache.

Flash memory and other solid-state memory devices can potentially create caches with much larger storage capacities than those using more expensive memory such as dynamic random-access memory (DRAM) cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM uses flash memory to store data, SCM exhibits some of the same limitations and deficiencies as flash memory, such as write-cycle limits and issues with data fragmentation.

Larger cache memory systems can improve the performance of data storage systems, since more data can be stored in the faster access memory. Cache management algorithms and processes can be implemented to increase the likelihood that frequently accessed data can be stored in the areas of cache memory that can be accessed more quickly.

In view of the foregoing, what are needed are systems and methods that improve cache memory management techniques and utilize larger cache memories that comprise multiple heterogeneous memory types.

SUMMARY

The invention has been developed in response to the present state of the art and, in particular, in response to the problems and needs in the art that have not yet been fully solved by currently available systems and methods. The features and advantages of the invention will become more fully apparent from the following description and appended claims, or may be learned by practice of the invention as set forth hereinafter.

According to an embodiment of the invention, a method for demoting storage elements, or data tracks, within a cache memory is disclosed. In an embodiment, the cache memory includes a higher performance portion and a lower performance portion that consist of different heterogeneous memory types. In an embodiment, the method stores favored and non-favored storage elements in the cache memory. The favored storage elements are retained in the cache memory longer than the non-favored data elements. In an embodiment, the method maintains an LRU list containing entries associated with the favored storage elements and an LRU list containing entries associated with the non-favored storage elements in the higher performance and lower performance portions of the cache. Each LRU lists designates an order for which the favored storage elements and non-favored storage elements are recently accessed within the higher performance and/or lower performance portions of the cache. In an embodiment, the method maintains a write access count for each favored and non-favored storage element in the higher and lower performance portions of the cache and increments the write count each time the favored or non-favored storage element is updated in the higher or lower performance portion of the cache. In an embodiment, the method also maintains a read access count for each favored or non-favored storage element in the higher and lower performance portion of the cache, and increments the read count each time the favored or non-favored storage element is read in the higher or lower performance portion of the cache. In an embodiment, the method selects a favored or non-favored storage element to be demoted from the higher performance or lower performance portion of the cache memory. In an embodiment, the method uses a cache demotion algorithm to demote the favored or non-favored storage elements between the higher performance portion of the cache, the lower performance portion of the cache, or the data storage devices.

According to other embodiments of the invention, a corresponding storage controller and computer program product are disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
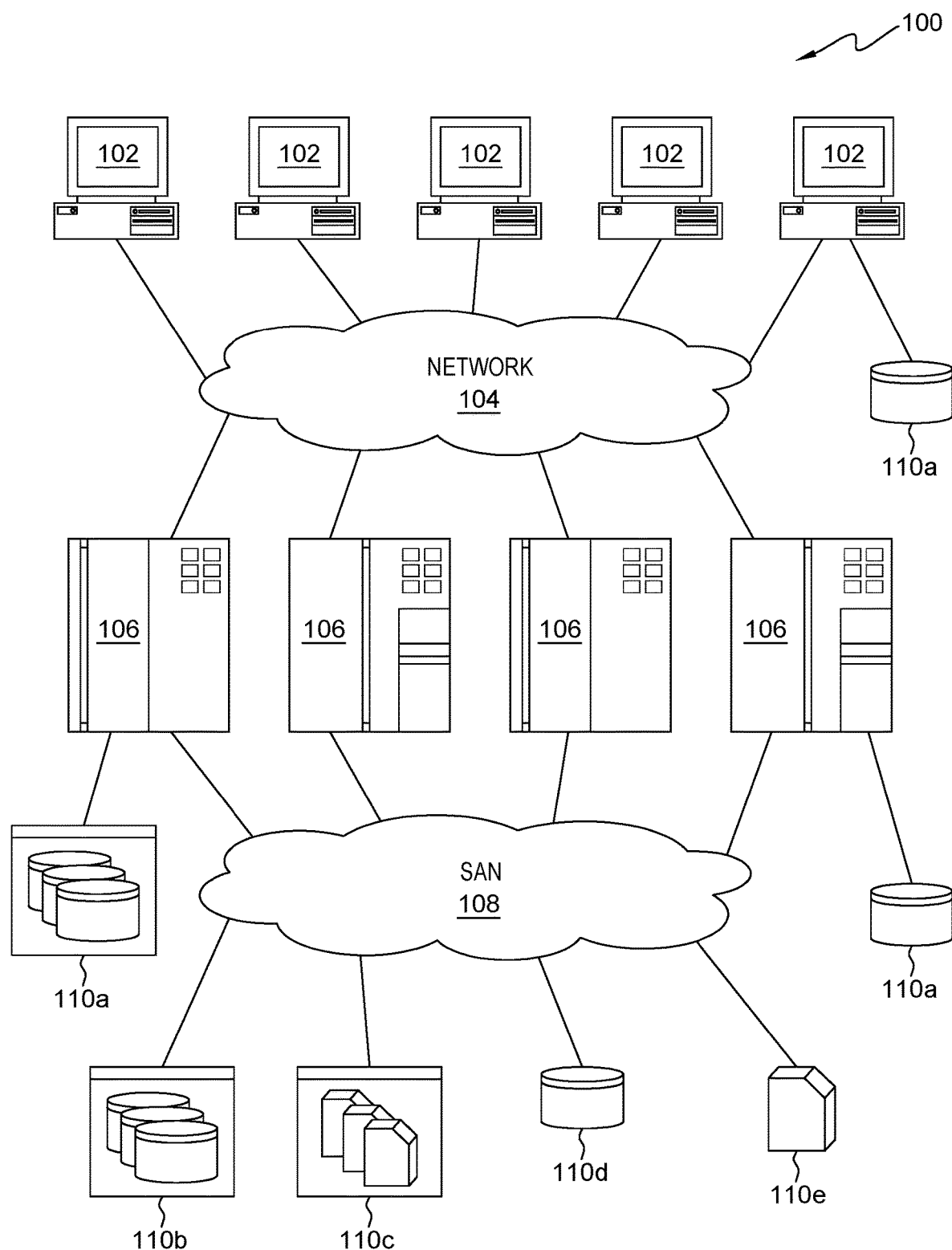
FIG. 1 is a high-level block diagram representing an example of a network environment, in which systems and methods in accordance with embodiments of the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 represents an example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" or "host processors" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
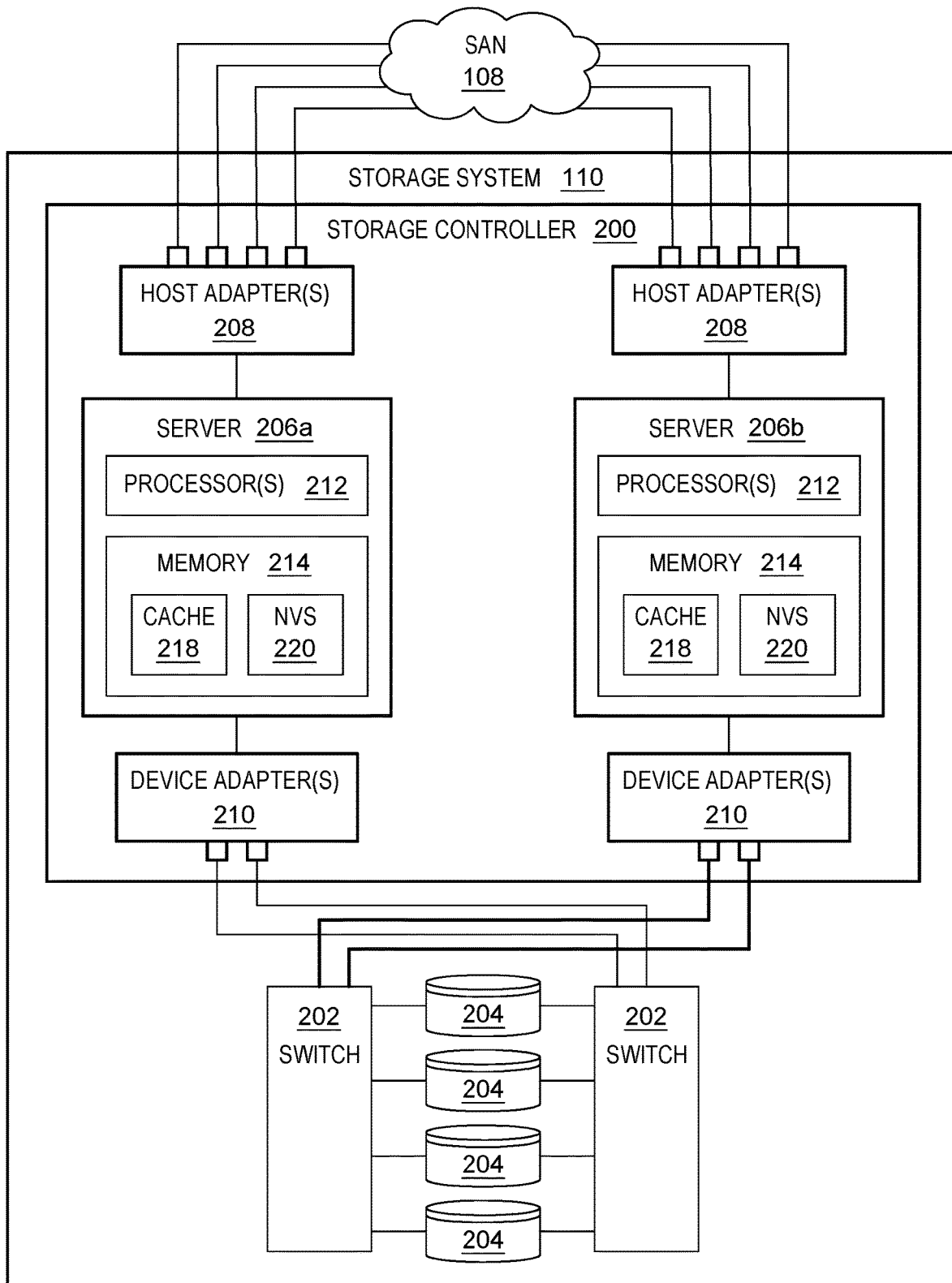
FIG. 2 is a high-level block diagram representing an example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host processor 106 (e.g., an open system or mainframe server 106) performs a read operation, the server 206 that performs the read operation may fetch data from the storages devices 204 and save it in its cache 218 in the event it is required again. If the data is requested again by a host processor 106, the server 206 may fetch the data from the cache 218 instead of fetching it from the storage devices 204, saving both time and resources. Similarly, when a host processor 106 performs a write operation, the server 106 that receives the write request may store the write data in its cache 218, and destage the write data to the storage devices 204 at a later time. When the write data is stored in cache 218, the write data may also be stored in non-volatile storage (NVS) 220 of the opposite server 206 so that the write data can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
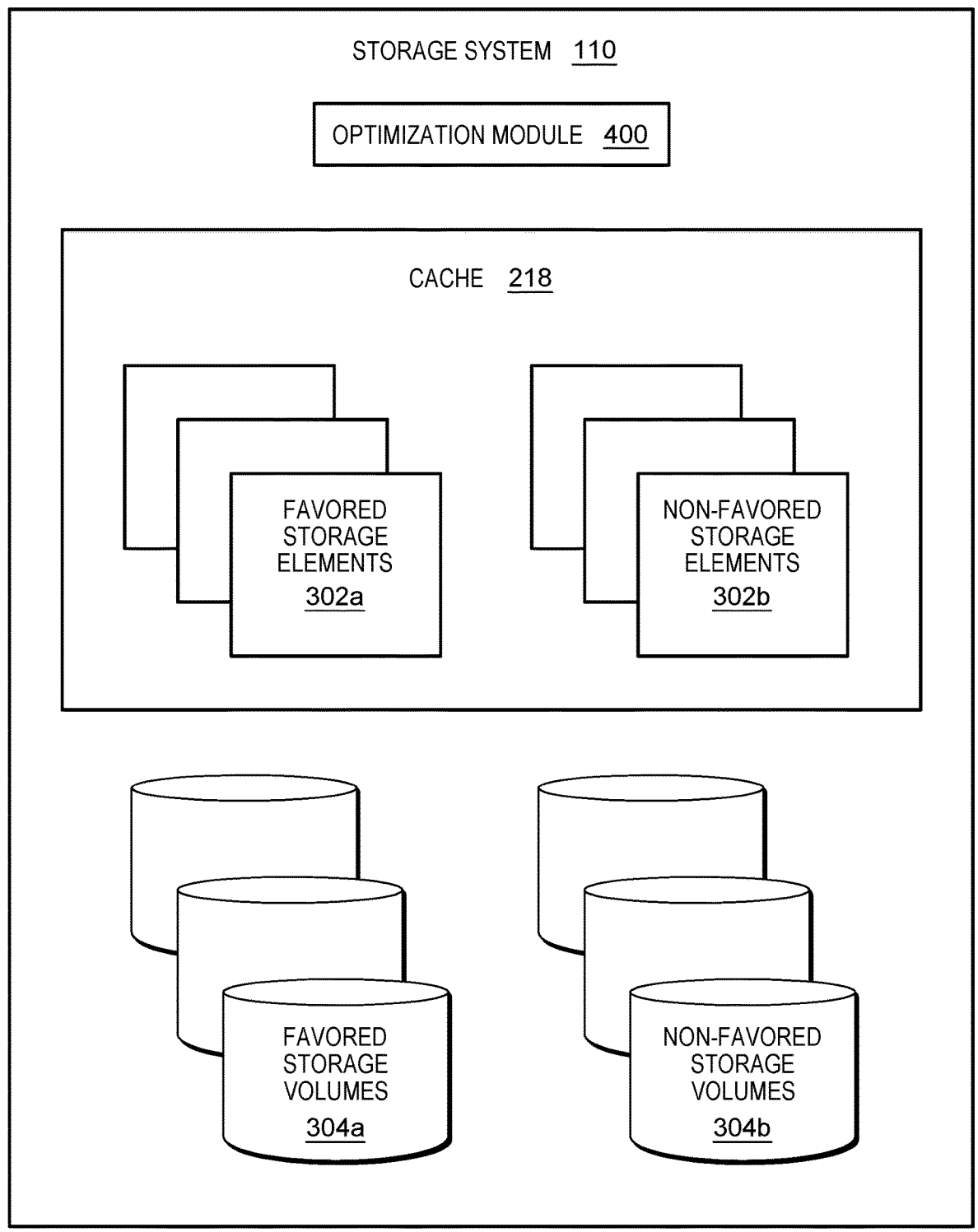
FIG. 3 is a high-level block diagram representing a storage system for improving cache memory management, in accordance with an embodiment of the invention.

Storing data in the cache memory 218 improves the performance of the storage system 110. I/O operations with the host processor 106 can complete much faster and quicker when the storage system 110 accesses the requested data from the cache memory 218 as compared to a storage device 204. FIG. 3 represents a high-level block diagram of a storage system 110 having a cache memory 218 that improves the storage system performance. In certain embodiments, storage volumes 304 in a storage system 110 may be divided into favored volumes 304a and non-favored volumes 304b. Favored volumes 304a may be storage volumes 304 that are preferably accessed by the host systems 106. These volumes 304a may be characterized as more important or critical, may contain data that is more important or critical (e.g. directories, etc), or may contain data where data access is more important or critical. Non-favored volumes 304b, by contrast, may be storage volumes that are not designated as favored volumes 304a.

Storage volumes 304 include storage elements 302, such as data tracks, in certain embodiments. Storage elements 302 from favored volumes 304a may be designated as favored storage elements 302a, whereas storage elements 302 from non-favored volumes 304b may be designated as non-favored storage elements 302b. Favored storage elements 302a and non-favored storage elements 302b may be stored in the cache memory 218. At any particular time, a first set of favored storage elements 302a from favored volumes 304a and a second set of non-favored storage elements 302b from non-favored volumes 304b may be stored in the cache memory 218. In certain embodiments, the favored storage elements 302a may be preferred in cache 218 over the non-favored storage elements 302b, because the favored volumes 304a are storage volumes 304 having data that needs to be accessed by host systems 106 from a faster and/or quicker medium.

In certain embodiments, a cache optimization module 400 provides priority and/or preferred treatment of favored storage elements 302a over non-favored storage elements 302b in the cache memory 218. The optimization module 400 provides logic and functionality to designate which storage volumes 304 are favored 304a and non-favored 304b, and to implement a cache demotion policy that allows favored storage elements 302a to reside in cache 218 longer than non-favored storage elements 302b.

Figure 4:
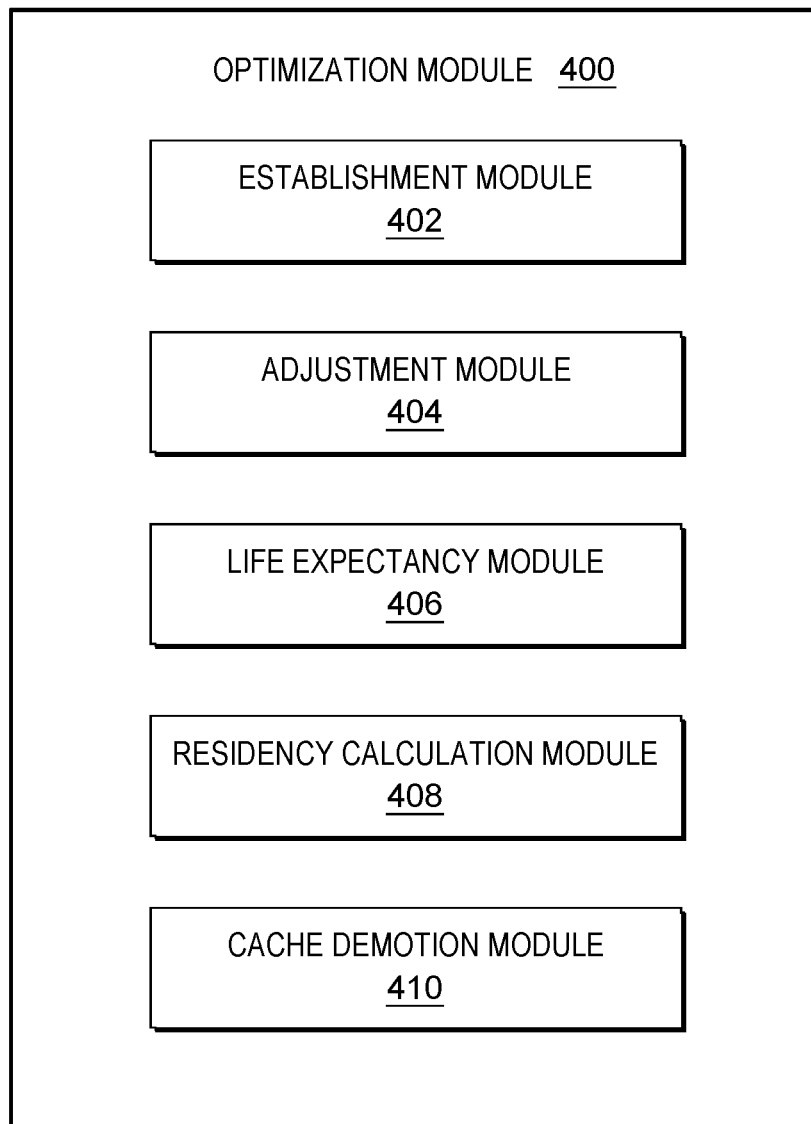
FIG. 4 is a high-level block diagram representing a cache optimization module and component modules, in accordance with an embodiment of the invention.

FIG. 4 represents a high-level block diagram of an embodiment of an optimization module 400. The optimization module 400 and component modules may be implemented in hardware, software, firmware, or combinations thereof. The optimization module 400 and component modules are presented by way of example and not limitation. A larger or smaller number of component modules may be provided in different embodiments. For example, the logic and functionality of some component modules may be combined into a single or smaller number of component modules, or the logic and functionality of a single component module may be distributed across several component modules. Although the optimization module 400 and component modules are shown within the storage system 110, all logic and functionality is not necessarily implemented within the storage system 110, nor is it limited to implementation within the storage system 110. Thus, the location of the optimization module 400 and component modules is provided by way of example and not limitation.

In an embodiment, the optimization module 400 may include one or more of an establishment module 402, an adjustment module 404, a life expectancy module 406, a residency calculation module 408, and a cache demotion module 410. The establishment module 402 may include logic and functionality to designate favored volumes 304a and non-favored volumes 304b, as previously discussed. In certain embodiments, the host system 106 communicates these designations to the storage system 110. In certain embodiments, the favored 304a and non-favored volumes 304b are established using an online command or a configuration list. In other embodiments, the host system 106 may include logic and functionality to determine which storage volumes 304 are favored 304a and non-favored 304b. For example, the host system 106 may observe I/O patterns and may determine that certain storage volumes 304 should be given priority or preference when accessed. The host system 106 may add these storage volumes 304 to the list of favored volumes 304a.

In certain embodiments, the adjustment module 404 includes logic and functionality to adjust which storage volumes 304 are favored 304a or non-favored 304b. For example, access patterns or data importance may change on the storage volumes 304 as time passes. In certain embodiments, the adjustment module 404 may adjust which storage volumes 304 are considered favored 304a or non-favored 304b as the access patterns or data importance change. In certain embodiments, the adjustment module 404 may enable a user or operator to manually adjust the storage volumes 304 that are considered favored 304a or non-favored 304b. In certain embodiments, the host system 106 sends commands and/or lists to the storage system 110 periodically to revise or update which storage volumes 304 are considered favored 304a or non-favored 304b.

In an embodiment, the life expectancy module 406 includes logic and functionality to determine the life expectancy of storage elements 302, or data tracks, in the cache memory 218. For example, in certain embodiments, the life expectancy module 406 is configured to determine the amount of time non-favored storage elements 302b will reside in cache memory 218 prior to being demoted or evicted. The life expectancy may be computed as a point in time or a time duration. In certain embodiments, the life expectancy is calculated by subtracting a timestamp of a least recently accessed non-favored storage element 302b in the cache 218, from a timestamp of a most recently accessed non-favored storage element 302b in the cache 218, where the timestamp for a particular storage element 302 indicates a point in time when the storage element 302 was most recently accessed.

In an embodiment, the residency calculation module 408 includes logic and functionality to calculate how long a particular storage element 302 has resided in the cache memory 218. The residency time may be calculated, for example, by subtracting the timestamp of a storage element 302, which indicates the point in time the storage element 302 was most recently accessed, from the current timestamp.

In an embodiment, the cache demotion module 410 includes logic and functionality to execute a cache demotion policy that maintains favored storage elements 302a in the cache 218 longer than non-favored storage elements 302b. The cache demotion module 410 may use the life expectancy calculated by the life expectancy module 406 and the residency time calculated by the residency calculation module 408 to maintain favored storage elements 302a in the cache 218 longer than the life expectancy of non-favored storage elements 302b. In certain embodiments, the cache demotion policy may require favored storage elements 302a to reside in cache 218 for double the life expectancy of non-favored storage elements 302b. In certain embodiments, the cache demotion policy may use other multiples, including numbers, decimals, or fractions that are greater than one, to maintain favored storage elements 302a in the cache memory 218. Such multiples are within the scope of the invention.

As stated earlier, flash memory and other solid-state memory devices can potentially create cache memories with much larger storage capacities than those using more expensive memory, such as DRAM. Storage class memory (SCM), for example, is a type of non-volatile NAND flash memory that provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of the potential to use SCM to create cache memories with much larger storage capacities, systems and methods are needed to effectively incorporate flash memory, such as SCM, into a cache memory.

Figure 5:
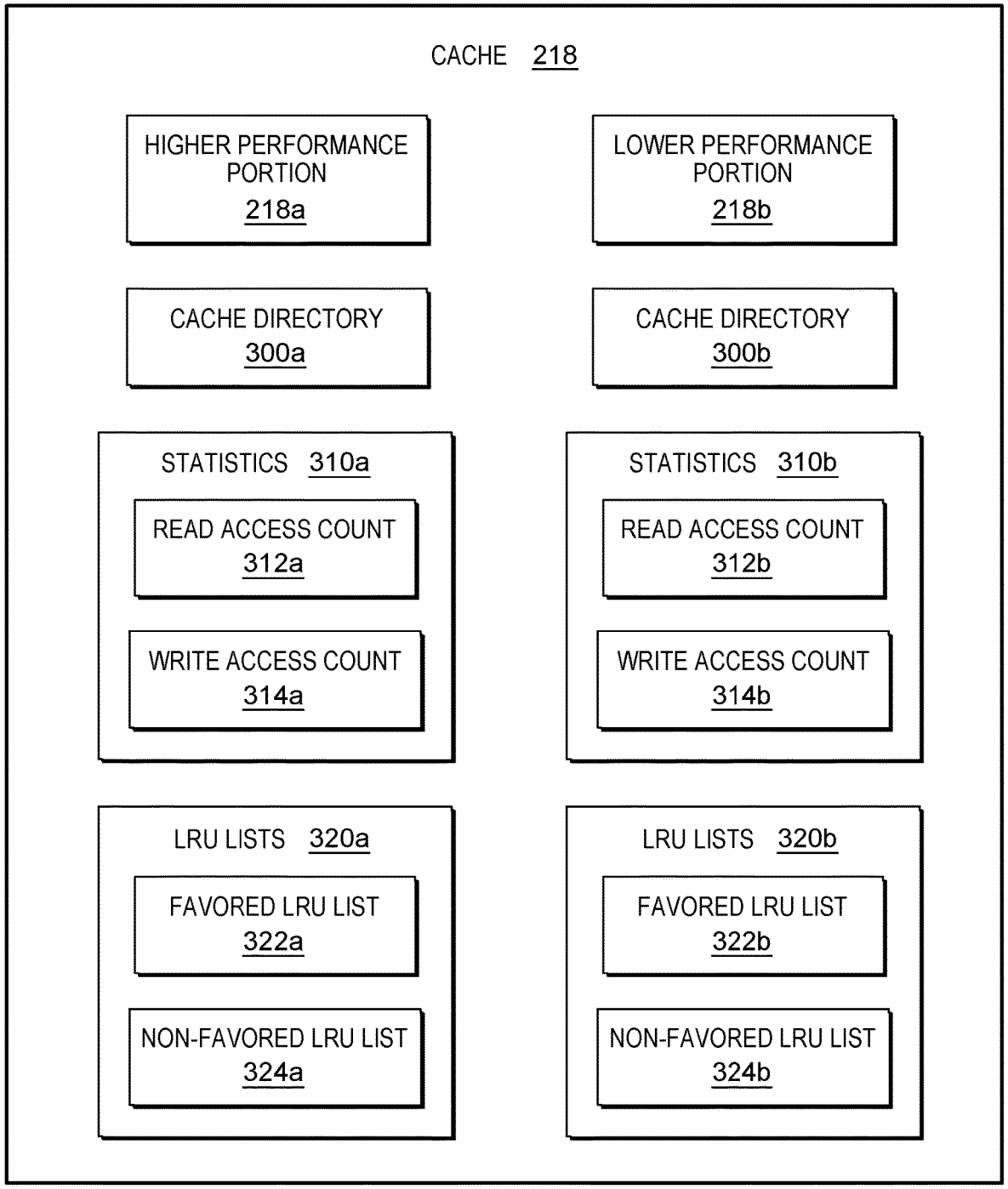
FIG. 5 is a high-level block diagram representing an improved cache memory system having higher performance and lower performance portions, in accordance with an embodiment of the invention.

FIG. 5 represents a high-level block diagram of a cache memory 218 that has a higher performance portion 218a and a lower performance portion 218b. In certain embodiments, the higher performance portion 218a is made up of DRAM memory and the lower performance portion 218b is made up of SCM memory, although neither are limited to these types of memory. The higher performance portion 218a and lower performance portion 218b may be used together to provide a cache 218 within a storage system 110 such as the IBM DS8000™ enterprise storage system. Because memory making up the lower performance portion 218b is likely cheaper than memory making up the higher performance portion 218a, the lower performance portion 218b may be larger, perhaps much larger, than the higher performance portion 218a.

In an embodiment, the higher performance portion 218a includes a cache directory 300a, statistics 310a, and LRU (least recently used) lists 320a. The cache directory 300a may record which storage elements 302, or data tracks, are stored in the higher performance portion 218a and the location in which the data is stored. In certain embodiments, the statistics 310a may include a read access count 312a and a write access count 314a for each storage element 302, or data track, that resides in the higher performance portion 218a. The read access count 312a may be incremented each time the data element is read in the higher performance portion 218a. The write access count 314a may be incremented each time the data element is modified in the higher performance portion 218a. In certain embodiments, the LRU list 320a includes a favored storage element LRU list 322a and non-favored storage element LRU list 324a. The LRU lists 320a include a list of entries associated with storage elements 302 stored in the higher performance portion of the cache, and the entries are ordered from the storage element 302 that was most recently accessed (MRU) to the storage element 302 that was least recently accessed (LRU). The entries in the LRU list 320a may include other information associated with the associated storage elements 302, such as the timestamp indicating the point in time the associated storage element 302 was recently accessed. The LRU lists 320a can be used to determine which storage element 302 in the higher performance portion 218a is the least recently used.

In an embodiment, the lower performance portion 218b of the cache memory 218 also includes a cache directory 300b, statistics 310b, and LRU (least recently used) lists 320b. The cache directory 300b may record which storage elements 302, or data tracks, are stored in the lower performance portion 218b and the location in which the data is stored. In certain embodiments, the statistics 310b may include a read access count 312b and a write access count 314b for each storage element 302, or data track, that resides in the lower performance portion 218b. The read access count 312b may be incremented each time the data element is read in the lower performance portion 218b. The write access count 314b may be incremented each time the data element is modified in the lower performance portion 218b. In certain embodiments, the LRU list 320b includes a favored storage element LRU list 322b and non-favored storage element LRU list 324b. The LRU lists 320b include a list of entries associated with the storage elements 302 stored within the lower performance portion of the cache, and the entries are ordered from the storage element 302 that was most recently accessed (MRU) to the storage element 302 that was least recently accessed (LRU). The entries in the LRU list 320b may include other information associated with the associated storage elements 302, such as the timestamp indicating the point in time the associated storage element 302 was recently accessed. The LRU lists 320b are used to determine which storage element 302 in the lower performance portion 218b is the least recently used.

As stated earlier, cache management strategies need to be developed to take advantage of favored storage elements 302 over non-favored volumes 304, and for expanded cache memories having a higher performance portion 218a and a lower performance portion 218b. In certain embodiments, cache management policies may give preference for storing more important data in the higher performance portion 218a over the lower performance portion 218b of the cache memory 218. In certain embodiments, cache management policies may give priority to demoting data tracks from the higher performance portion 218a to the lower performance portion 218b of the cache 218. In certain embodiments, cache management policies may give preference to favored storage elements 302a over non-favored storage elements 302b when demoting data from the higher performance portion 218a to the lower performance portion 218b of cache, or promoting data from the lower performance portion 218b to the higher performance portion 218a of cache.

Figure 6:
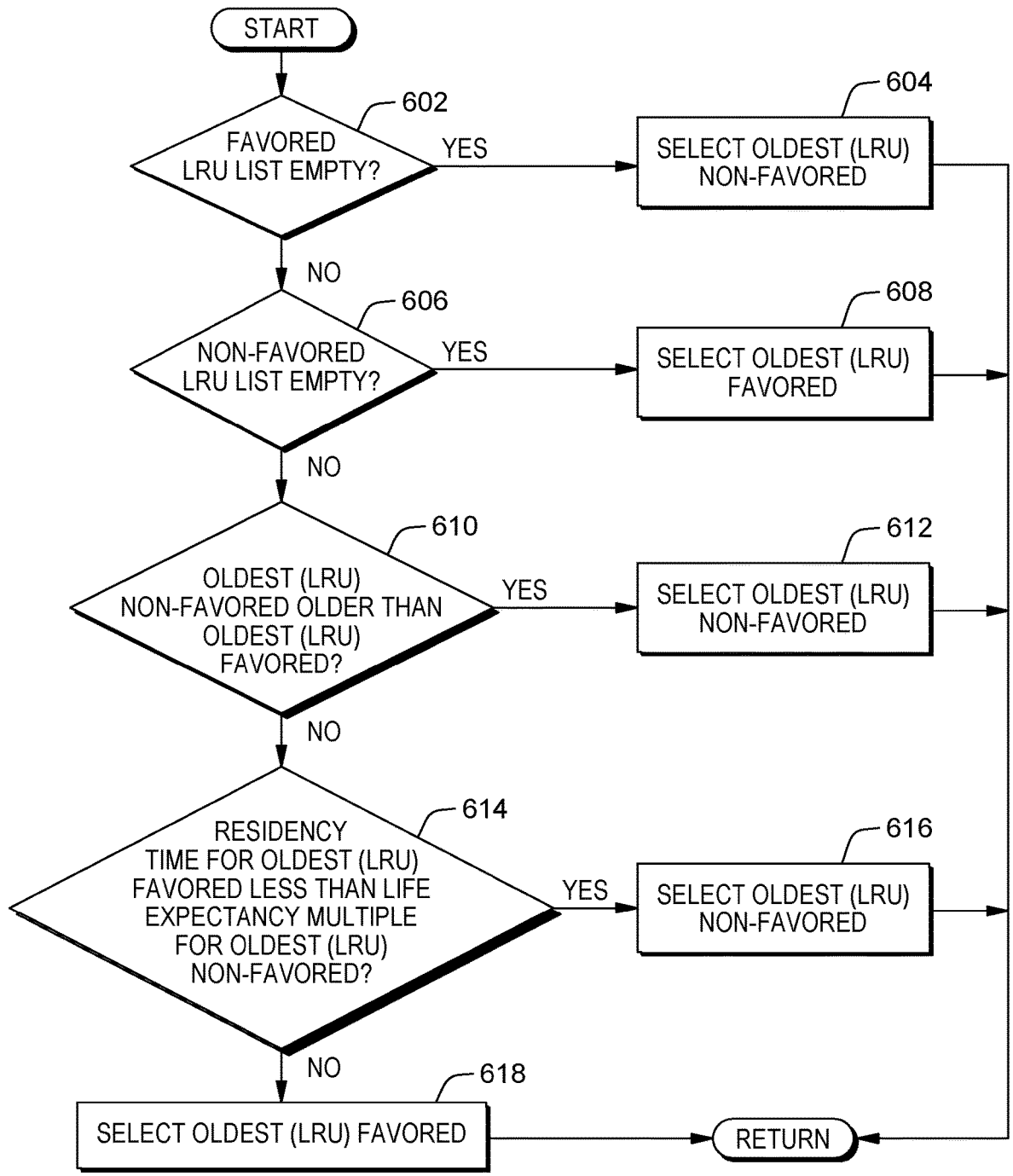
FIG. 6 is a flow diagram representing an embodiment of a method for selecting a favored or non-favored storage element to be demoted from a higher performance portion or a lower performance portion of a cache memory.

FIG. 6 represents an embodiment of a method 600 for selecting storage elements 302 to be demoted from the cache memory 218 to free up space in the cache memory 218. The method 600 references favored storage elements 302a and non-favored storage elements 302b, and can be invoked by logic controlling either the higher performance portion 218a or lower performance portion 218b of cache. In certain embodiments, the favored storage elements 302a that reside in the cache memory 218 are indicated in a first LRU (least recently used) list, or a "favored" LRU list 322, and the non-favored storage elements 302b are indicated in a second LRU list, or a "non-favored" LRU list 324. The method 600 describes which storage element 302, between favored storage elements 302a and non-favored storage elements 302b, is selected for demotion from either the higher performance portion 218a or the lower performance portion 218b of the cache memory 218.

In certain embodiments, the method 600 is invoked when alternate methods determine that the higher performance portion 218a or the lower performance portion 218b of the cache 218 need to demote one or more storage elements 302a, 302b. If the method 600 is invoked because space is needed in the higher performance cache portion 218a, the favored LRU list 322a, non-favored LRU list 324a, cache directory 300a, and statistics 310a for the higher performance portion 218a are used to determine if a favored 302a or non-favored 302b storage element is selected. If the method 600 is invoked because space is needed in the lower performance cache portion 218b, then the favored LRU list 322b, non-favored LRU list 324b, cache directory 300b, and statistics 310b associated with the lower performance portion 218b are used. In an embodiment, the method 600 initially determines at step 602 whether the favored LRU list 322 is empty. If so, the method 600 selects at step 604 the oldest non-favored storage element 302b, as indicated by the non-favored storage element 302b having the oldest timestamp and/or the LRU entry from the non-favored LRU list 324, for demotion from cache 218. If the favored LRU list 322 is not empty, the method 600 determines at step 606 whether the non-favored LRU list 324 is empty. If so, the method 600 at step 608 selects the oldest favored storage element 302a, as indicated by the favored storage element 302a having the oldest timestamp and/or the LRU entry from the favored LRU list 322, to be demoted from cache 218.

If neither the non-favored LRU list nor the favored LRU list is empty, the method 600 proceeds to step 610 and determines whether the oldest non-favored storage element 302b as indicated in the non-favored LRU list 324 has an older timestamp than the oldest favored storage element 302a as indicated in the favored LRU list 322. If so, the method 600 selects at step 612 the oldest non-favored storage element 302b, as indicated by the LRU entry in the non-favored LRU list 324, for demotion from the cache memory 218. If not, the method 600 determines at step 614 whether the residency time of an oldest favored storage element 302a in the cache memory 218, as indicated by the timestamp of the LRU entry in the favored LRU list 322, is less than the life expectancy of non-favored storage elements 302b in the cache 218 multiplied by a designated multiplier N. If so, the method 600 selects at step 616 the oldest non-favored storage element 302b, as indicated by the LRU entry in the non-favored LRU list 324, for demotion from the cache memory 218. Otherwise, if the residency time for an oldest favored storage element 302a as indicated by the LRU entry in the favored LRU list 322 is more than the life expectancy of non-favored storage elements 302b in the cache 218 multiplied by the designated multiplier N, the method 600 selects at step 618 the oldest favored storage element 302a, as indicated by the LRU entry in the favored LRU list 322, for demotion from cache 218. In certain embodiments, the host processor 106 designates the residency multiplier N for favored volumes 304a over non-favored volumes 304b to the storage system 110.

Figure 7:
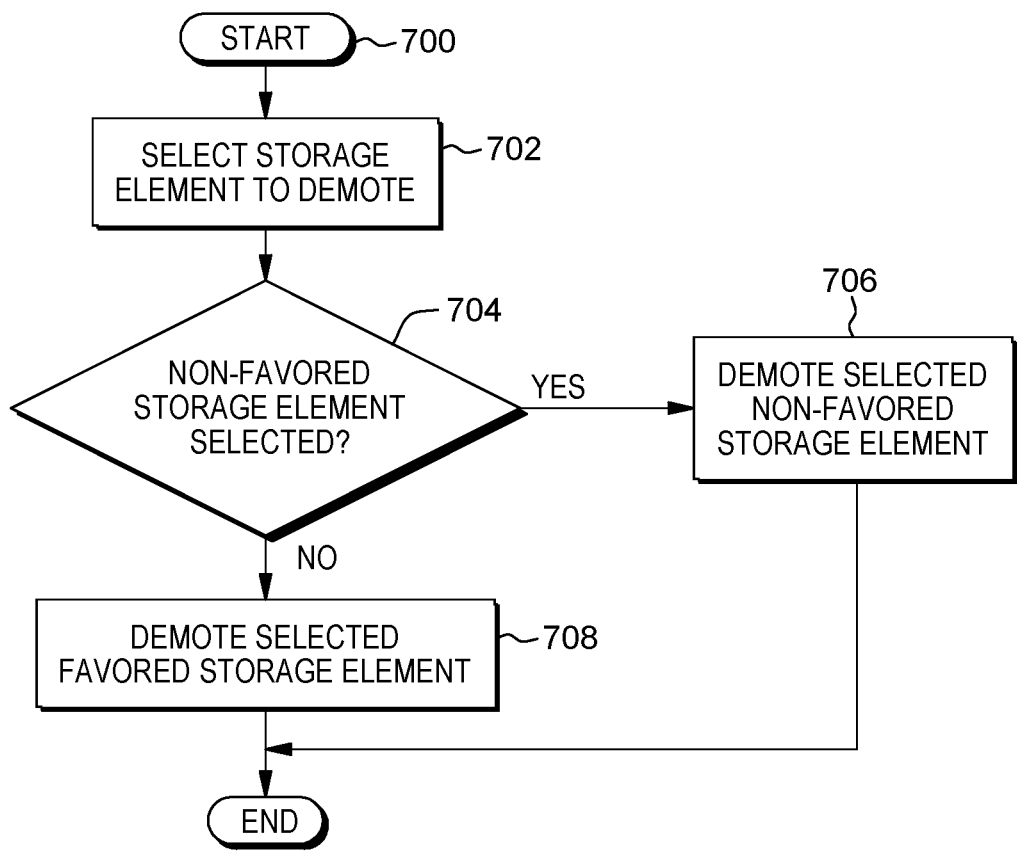
FIG. 7 is a flow diagram representing an embodiment of a method for demoting a selected storage element from a lower performance portion of a cache memory.

FIG. 7 represents an embodiment of a method 700 for demoting a storage element 302b from the lower performance portion 218b of the cache memory 218. In an embodiment, the method 700 is invoked when space is needed in the lower performance portion 218b to accommodate additional storage elements 302b. In certain embodiments, the amount of free or available space within the lower performance portion 218b may fall below a certain threshold, and the method 700 is invoked to demote either a favored storage element 302a or a non-favored storage element 302b. The method 700 initially selects at step 702 a storage element 302a, 302b as a potential candidate for demotion from the lower performance portion 218b by invoking the method 600 described in FIG. 6, or by performing a similar analysis.

In an embodiment, the method 700 determines at step 704 whether the selected storage element is a non-favored storage element 302b. If so, the method 700 demotes at step 706 the oldest non-favored storage element 302b from the lower performance portion 218b, by removing the LRU entry from the non-favored LRU list 324b and removing the non-favored storage element 302b indicated by the LRU entry from the lower performance portion 218b of the cache memory 218. If the selected storage element is a favored storage element 320a, the method 700 demotes at step 708 the oldest favored storage element 302a from the lower performance portion 218b, by removing the LRU entry from the favored LRU list 322b and removing the favored storage element 302a indicated by the LRU entry from the lower performance portion 218b of the cache memory 218.

Figure 8A:
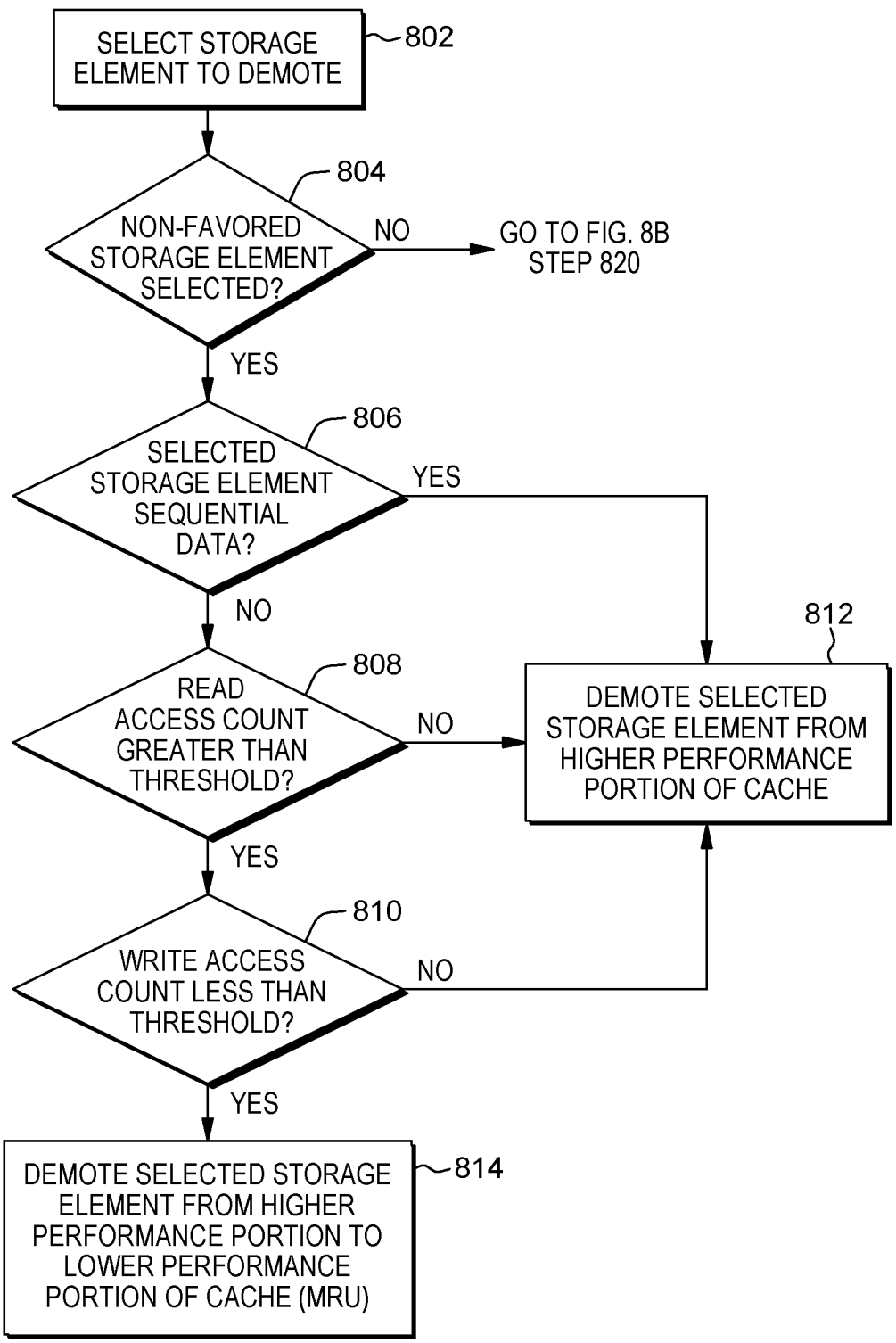
FIGS. 8A and 8B are flow diagrams representing an embodiment of a method for demoting a selected storage element from a higher performance portion of a cache memory to a lower portion of a cache memory, or to a data storage device.
Figure 8B:
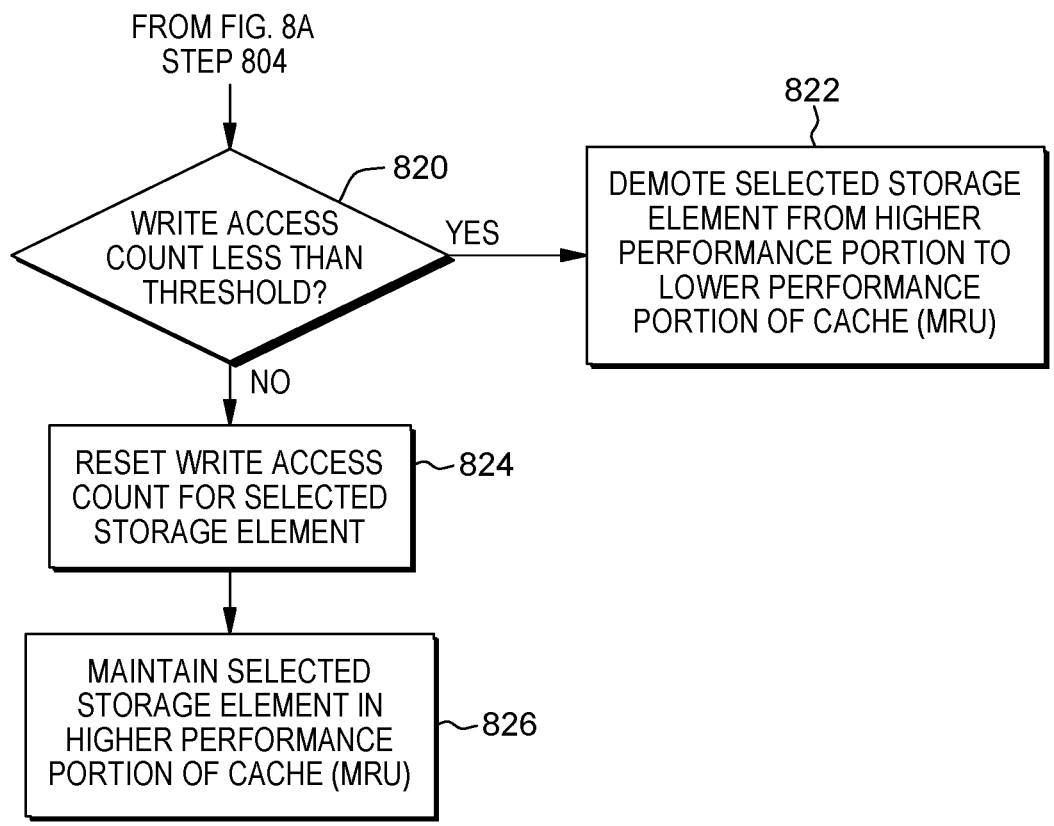

FIGS. 8A and 8B represent an embodiment of a method 800 for demoting a storage element 302 from the higher performance portion 218a of the cache memory. In an embodiment, the method 800 is invoked when space is needed in the higher performance portion 218a to accommodate additional storage elements 302a, 302b. In certain embodiments, the amount of free or available space within the higher performance portion 218a may fall below a certain threshold, and the method 800 is invoked to demote either a favored storage element 302a or a non-favored storage element 302b. In an embodiment, the method 800 initially selects a storage element 302a, 302b at step 802 as a potential candidate for demotion from the higher performance portion 218a by invoking the method 600 described in FIG. 6, or by performing a similar analysis.

In an embodiment, the method 800 determines at step 804 whether the selected storage element is a non-favored storage element 302a. If the selected storage element is a non-favored storage element 302b, the method 800 determines at step 806 whether the selected non-favored storage element 302b is sequential data. If so, the method 800 proceeds to step 812 to demote the non-favored storage element 302b from the higher performance cache portion 218a, since it would be disadvantageous to add sequential data to the lower performance portion 218b. If the selected non-favored storage element 302b is not sequential data, the method 800 next determines at step 808 whether the read access count 312a associated with the non-favored storage element 302b is greater than a specified threshold and determines at step 810 whether the write access count 314a associated with the non-favored storage element 302b is less than a specified threshold. If both of these conditions are true, the method 800 proceeds to step 814 to demote the selected non-favored storage element 302b from the higher performance cache portion 218a to the lower performance cache portion 218b. Thus, the method 800 demotes non-favored storage elements 302b from the higher performance portion 218a to the lower performance portion 218b, if the storage elements 302b are read frequently, which enhances future read performance for the storage elements 302, and written infrequently, since excessive writes to the storage elements 302 may place excessive wear on the lower performance portion 218b of the cache 218. If both conditions in method steps 808 and 810 are not true, the method 800 proceeds to step 812 to demote the selected non-favored storage element from higher performance cache portion 218a.

In an embodiment, if method step 804 selects a favored storage element 302a, the method 800 then proceeds to step 820 in FIG. 8B to determine whether the write access count 314a for the favored storage element 302a is less than a specified threshold. If so, the method proceeds to step 822 to demote the selected favored storage element 302a from the higher performance cache portion 218a to the lower performance cache portion 218b. If the write access count is not less than the specified threshold, the method 800 resets at step 824 the favored the write access count for the selected favored storage element 302a, and maintains at step 826 the selected favored storage element 302a in the higher performance cache portion 218a.

In an embodiment, the method step 812 demotes the selected non-favored storage element 302b from the higher performance cache portion 218a by removing the storage element 302b from the higher performance cache portion 218a and removing the indicator, or entry, for the selected storage element from the non-favored LRU list 324a associated with the higher performance cache portion 218a. The method step 814 demotes a selected non-favored storage element 302b from the higher performance cache portion 218a to the lower performance cache portion 218b by transferring the non-favored storage element 302b from the higher performance cache portion 218a to the lower performance cache portion 218b. The method step 814 also removes the indicator, or entry, for the selected non-favored storage element 302b from the non-favored LRU list 324a associated with the higher performance cache portion 218a and adds the indicator, or entry to the most recently used (MRU) end of the favored LRU list 324b associated with the lower performance cache portion 218b.

In an embodiment, the method step 822 demotes a selected favored storage element 302a from the higher performance cache portion 218a to the lower performance cache portion 218b by transferring the favored storage element 302a from the higher performance cache portion 218a to the lower performance cache portion 218b. The method step 822 also removes the indicator, or entry, for the selected favored storage element 302a from the favored LRU list 322a associated with the higher performance cache portion 218a and adds the indicator, or entry to the most recently used (MRU) end of the favored LRU list 322b associated with the lower performance cache portion 218b. The method step 824 maintains the selected favored storage element in the high performance cache portion 218a and moves the indicator, or entry, for the selected storage element 302a to the most recently used (MRU) end of the favored LRU list 322a for the higher performance cache portion 218a.

As stated previously, cache management methods and systems improve the performance of storage systems by maintaining highly accessed data tracks in the cache memory 218, and reducing the time to read the requested data. Thus, demoting storage elements 302, or data tracks, from the cache memory 218 is an important element of an effective cache memory management policy. The present invention focuses on managing the priority for favored volumes 304a over non-favored volumes 304b, and the preference of the high performance cache portion 218a over the lower cache portion 218b, when determining which data tracks to demote from the cache memory 218, and from the higher performance cache portion 218a to the lower performance cache portion 218b. The present invention does not describe other elements of effective cache management methods and systems, such as promoting data tracks from the storage devices 204 to the cache memory 218, or between the high performance cache portion 218a and the lower performance cache portion 218b.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed:

1. A computer program product for demoting selected storage elements within a storage system, the computer program product comprising a non-transitory computer-readable storage medium having computer-usable program code embodied therein, the computer-usable program code configured to perform operations when executed by at least one processor, the operations comprising:

storing favored storage elements and non-favored storage elements within a cache memory, the cache memory comprising a higher performance portion and a lower performance portion;

maintaining a first favored LRU list and a first non-favored LRU list within the higher performance portion, wherein the first favored LRU list includes entries associated with the favored storage elements stored within the higher performance portion and ordered according to when the favored storage element was recently accessed, and wherein the first non-favored LRU list includes entries associated with the non-favored storage elements stored within the higher performance portion and ordered according to when the non-favored storage element was recently accessed;

selecting a first selected storage element from the first favored LRU list or the first non-favored LRU list to demote from the higher performance portion when space is needed in the higher performance portion, wherein the selecting the first selected storage element comprises selecting an oldest favored storage element from the first favored LRU list if the first non-favored LRU list is empty and selecting an oldest non-favored storage element from the first non-favored LRU list if the first favored LRU list is empty; and demoting the first selected storage element from the cache memory, or from the higher performance portion to the lower performance portion, according to a cache demotion policy.

2. The computer program product of claim 1, wherein the selecting the first selected storage element further comprises:

comparing the oldest favored storage element from the first favored LRU list with the oldest non-favored storage element from the first non-favored LRU list;

selecting the oldest favored storage element if the oldest favored storage element is older than the oldest non-favored storage element and a residency time for the oldest favored storage element is greater than a designated multiple of a life expectancy for the oldest non-favored storage element; and otherwise selecting the oldest non-favored storage element.

3. The computer program product of claim 2, wherein the residency time for the oldest favored storage element is calculated by a difference between a current timestamp and a timestamp when the oldest favored storage element was recently accessed; and wherein the life expectancy for the oldest non-favored storage element is calculated by a difference between a timestamp when the newest non-favored storage element was recently accessed and a timestamp when the oldest non-favored storage element was recently accessed.

4. The computer program product of claim 3, further comprising:

maintaining a first read access count and a first write access count for each storage element stored in the higher performance portion, the first read access count is incremented when the storage element is read from a storage location in the higher performance portion, the first write access count is incremented when the storage element is written to a storage location in the higher performance portion.

5. The computer program product of claim 4, wherein the cache demotion policy further comprises:
demoting the oldest favored storage element from the higher performance portion to the lower performance portion if the first write access count for the oldest favored storage element is greater than a designated write threshold;
maintaining the oldest favored storage element in the higher performance portion if the first write access count for the oldest favored storage element is greater than the designated write threshold;
demoting the oldest non-favored storage element from the higher performance portion to the lower performance portion if the oldest non-favored storage element is not sequential data and the first read access count for the oldest non-favored storage element is greater than a designated read threshold and the first write access count for the oldest non-favored storage element is less than the designated write threshold; and
otherwise demoting the oldest non-favored storage element from the cache memory.

6. The computer program product of claim 5, wherein:
demoting the oldest favored storage element from the higher performance portion to the lower performance portion further comprises transferring the oldest favored storage element from the higher performance portion to the lower performance portion, and moving the oldest favored storage element entry from the least recently accessed position in the first favored LRU list to the most recently accessed position in the second favored LRU list;
demoting the oldest non-favored storage element from the higher performance portion to the lower performance portion further comprises transferring the oldest non-favored storage element from the higher performance portion to the lower performance portion, and moving the oldest non-favored storage element entry from the least recently accessed position in the first non-favored LRU list to the most recently accessed position in the second non-favored LRU list,
maintaining the oldest favored storage element in the higher performance portion further comprises moving the oldest favored storage element entry from the least recently accessed position in the first favored LRU list to the most recently accessed position in the first favored LRU list and resetting the read access count for the oldest favored storage element; and
demoting the first non-favored storage element from the cache memory further comprises removing the oldest non-favored storage element from the higher performance portion and removing the oldest non-favored storage element entry from first non-favored LRU list.

7. The computer program product of claim 3, further comprising:
maintaining a second favored LRU list and a second non-favored LRU list within the lower performance portion, wherein the second favored LRU list includes entries associated with the favored storage elements stored within the lower performance portion and ordered according to when the favored storage element was recently accessed, and wherein the second non-favored LRU list includes entries associated with the non-favored storage elements stored within the lower performance portion and ordered according to when the non-favored storage element was recently accessed;
selecting a second selected storage element from the second favored LRU list or the second non-favored LRU list to demote from the lower performance portion when space is needed in the lower performance portion; and
demoting the second selected storage element from the cache memory.

8. The computer program product of claim 7, wherein the selecting the second selected storage element further comprises:
selecting an oldest favored storage element from the second favored LRU list if the second non-favored LRU list is empty;
comparing the oldest favored storage element from the second favored LRU list with the oldest non-favored storage element from the second non-favored LRU list;
selecting the oldest favored storage element if the oldest favored storage element is older than the oldest non-favored storage element and the residency time for the oldest favored storage element is greater than the designated multiple of the life expectancy for the oldest non-favored storage element; and
otherwise selecting the oldest non-favored storage element.

9. The computer program product of claim 8, wherein the demoting the second selected storage element from the cache memory further comprises:
removing the second selected storage element from the lower performance portion; and
removing the second selected storage element entry from either the second favored LRU list or the second non-favored LRU list.

10. A method for demoting selected storage elements within a storage system, the storage system including at least one processor, a cache memory, and a computer-readable storage medium having computer-usable program code embodied therein, the computer-usable program code configured to perform the method when executed by the at least one processor, the method comprising:
storing favored storage elements and non-favored storage elements within the cache memory, the cache memory comprising a higher performance portion and a lower performance portion;
maintaining a first favored LRU list and a first non-favored LRU list within the higher performance portion, wherein the first favored LRU list includes entries associated with the favored storage elements stored within the higher performance portion and ordered according to when the favored storage element was recently accessed, and wherein the first non-favored LRU list includes entries associated with the non-favored storage elements stored within the higher performance portion and ordered according to when the non-favored storage element was recently accessed;
selecting a first selected storage element from the first favored LRU list or the first non-favored LRU list to demote from the higher performance portion when space is needed in the higher performance portion, wherein the selecting the first selected storage element comprises selecting an oldest favored storage element from the first favored LRU list if the first non-favored LRU list is empty and selecting an oldest non-favored storage element from the first non-favored LRU list if the first favored LRU list is empty; and demoting the first selected storage element from the cache memory, or from the higher performance portion to the lower performance portion, according to a cache demotion policy.

11. The method of claim 10, wherein the selecting the first selected storage element further comprises:
   comparing the oldest favored storage element from the first favored LRU list with the oldest non-favored storage element from the first non-favored LRU list;
   selecting the oldest favored storage element if the oldest favored storage element is older than the oldest non-favored storage element and a residency time for the oldest favored storage element is greater than a designated multiple of a life expectancy for the oldest non-favored storage element; and
   otherwise selecting the oldest non-favored storage element.

12. The method of claim 11, wherein the residency time for the oldest favored storage element is calculated by a difference between a current timestamp and a timestamp when the oldest favored storage element was recently accessed; and wherein the life expectancy for the oldest non-favored storage element is calculated by a difference between a timestamp when the newest non-favored storage element was recently accessed and a timestamp when the oldest non-favored storage element was recently accessed.

13. The method of claim 12, further comprising:
   maintaining a first read access count and a first write access count for each storage element stored in the higher performance portion, the first read access count is incremented when the storage element is read from a storage location in the higher performance portion, the first write access count is incremented when the storage element is written to a storage location in the higher performance portion.

14. The method of claim 13, wherein the cache demotion policy further comprises:
   demoting the oldest favored storage element from the higher performance portion to the lower performance portion if the first write access count for the oldest favored storage element is greater than a designated write threshold;
   maintaining the oldest favored storage element in the higher performance portion if the first write access count for the oldest favored storage element is greater than the designated write threshold;
   demoting the oldest non-favored storage element from the higher performance portion to the lower performance portion if the oldest non-favored storage element is not sequential data and the first read access count for the oldest non-favored storage element is greater than a designated read threshold and the first write access count for the oldest non-favored storage element is less than the designated write threshold; and
   otherwise demoting the oldest non-favored storage element from the cache memory.

15. The method of claim 14, wherein:
   demoting the oldest favored storage element from the higher performance portion to the lower performance portion further comprises transferring the oldest favored storage element from the higher performance portion to the lower performance portion, and moving the oldest favored storage element entry from the least recently accessed position in the first favored LRU list to the most recently accessed position in the second favored LRU list;
   demoting the oldest non-favored storage element from the higher performance portion to the lower performance portion further comprises transferring the oldest non-favored storage element from the higher performance portion to the lower performance portion, and moving the oldest non-favored storage element entry from the least recently accessed position in the first non-favored LRU list to the most recently accessed position in the second non-favored LRU list,
   maintaining the oldest favored storage element in the higher performance portion further comprises moving the oldest favored storage element entry from the least recently accessed position in the first favored LRU list to the most recently accessed position in the first favored LRU list and resetting the read access count for the oldest favored storage element; and
   demoting the first non-favored storage element from the cache memory further comprises removing the oldest non-favored storage element from the higher performance portion.

16. The method of claim 10, further comprising:
   maintaining a second favored LRU list and a second non-favored LRU list within the lower performance portion, wherein the second favored LRU list includes entries associated with the favored storage elements stored within the lower performance portion and ordered according to when the favored storage element was recently accessed, and wherein the second non-favored LRU list includes entries associated with the non-favored storage elements stored within the lower performance portion and ordered according to when the non-favored storage element was recently accessed;
   selecting a second selected storage element from the second favored LRU list or the second non-favored LRU list to demote from the lower performance portion when space is needed in the lower performance portion; and
   demoting the second selected storage element from the cache memory.

17. A storage controller for demoting selected storage elements within a storage system, the storage controller including a processor, a cache memory, and a non-transitory computer-readable storage medium having computer-usable program code embodied therein, the computer-usable program code configured to perform operations when executed by the processor, the operations comprising:
   storing favored storage elements and non-favored storage elements within the cache memory, the cache memory comprising a higher performance portion and a lower performance portion;
   maintaining a first favored LRU list and a first non-favored LRU list within the higher performance portion, wherein the first favored LRU list includes entries associated with the favored storage elements stored within the higher performance portion and ordered according to when the favored storage element was recently accessed, and wherein the first non-favored LRU list includes entries associated with the non-favored storage elements stored within the higher performance portion and ordered according to when the non-favored storage element was recently accessed;
   selecting a first selected storage element from the first favored LRU list or the first non-favored LRU list to demote from the higher performance portion when space is needed in the higher performance portion, wherein the selecting the first selected storage element comprises selecting an oldest favored storage element from the first favored LRU list if the first non-favored LRU list is empty and selecting an oldest non-favored storage element from the first non-favored LRU list if the first favored LRU list is empty; and demoting the first selected storage element from the cache memory, or from the higher performance portion to the lower performance portion, according to a cache demotion policy.

18. The storage controller of claim 17, wherein the selecting the first selected storage element further comprises:

comparing the oldest favored storage element from the first favored LRU list with the oldest non-favored storage element from the first non-favored LRU list;

selecting the oldest favored storage element if the oldest favored storage element is older than the oldest non-favored storage element and a residency time for the oldest favored storage element is greater than a designated multiple of a life expectancy for the oldest non-favored storage element; and otherwise selecting the oldest non-favored storage element.

19. The storage controller of claim 18, wherein the residency time for the oldest favored storage element is calculated by a difference between a current timestamp and a timestamp when the oldest favored storage element was recently accessed; and wherein the life expectancy for the oldest non-favored storage element is calculated by a difference between a timestamp when the newest non-favored storage element was recently accessed and a timestamp when the oldest non-favored storage element was recently accessed.

20. The storage controller of claim 19, further comprising:

maintaining a first read access count and a first write access count for each storage element stored in the higher performance portion, the first read access count is incremented when the storage element is read from a storage location in the higher performance portion, the first write access count is incremented when the storage element is written to a storage location in the higher performance portion.

21. The storage controller of claim 20, wherein the cache demotion policy further comprises:

demoting the oldest favored storage element from the higher performance portion to the lower performance portion if the first write access count for the oldest favored storage element is greater than a designated write threshold;

maintaining the oldest favored storage element in the higher performance portion if the first write access count for the oldest favored storage element is greater than the designated write threshold;

demoting the oldest non-favored storage element from the higher performance portion to the lower performance portion if the oldest non-favored storage element is not sequential data and the first read access count for the oldest non-favored storage element is greater than a designated read threshold and the first write access count for the oldest non-favored storage element is less than the designated write threshold; and otherwise demoting the oldest non-favored storage element from the cache memory.

22. The storage controller of claim 21, wherein:

demoting the oldest favored storage element from the higher performance portion to the lower performance portion further comprises transferring the oldest favored storage element from the higher performance portion to the lower performance portion, and moving the oldest favored storage element entry from the least recently accessed position in the first favored LRU list to the most recently accessed position in the second favored LRU list;

demoting the oldest non-favored storage element from the higher performance portion to the lower performance portion further comprises transferring the oldest non-favored storage element from the higher performance portion to the lower performance portion, and moving the oldest non-favored storage element entry from the least recently accessed position in the first non-favored LRU list to the most recently accessed position in the second non-favored LRU list, maintaining the oldest favored storage element in the higher performance portion further comprises moving the oldest favored storage element entry from the least recently accessed position in the first favored LRU list to the most recently accessed position in the first favored LRU list and resetting the read access count for the oldest favored storage element; and demoting the first non-favored storage element from the cache memory further comprises removing the oldest non-favored storage element from the higher performance portion.

23. The storage controller of claim 17, further comprising:

maintaining a second favored LRU list and a second non-favored LRU list within the lower performance portion, wherein the second favored LRU list includes entries associated with the favored storage elements stored within the lower performance portion and ordered according to when the favored storage element was recently accessed, and wherein the second non-favored LRU list includes entries associated with the non-favored storage elements stored within the lower performance portion and ordered according to when the non-favored storage element was recently accessed;

selecting a second selected storage element from the second favored LRU list or the second non-favored LRU list to demote from the lower performance portion when space is needed in the lower performance portion; and demoting the second selected storage element from the cache memory.

* * * * *